United States Patent
German et al.

(10) Patent No.: US 9,870,773 B2
(45) Date of Patent: Jan. 16, 2018

(54) MULTI-TIER INTELLIGENT INFRASTRUCTURE MANAGEMENT SYSTEMS FOR COMMUNICATIONS SYSTEMS AND RELATED EQUIPMENT AND METHODS

(71) Applicant: CommScope, Inc. of North Carolina, Hickory, NC (US)

(72) Inventors: Michael G. German, Secaucus, NJ (US); G. Mabud Choudhury, Warren, NJ (US); Matias Peluffo, Guadalajara (ES)

(73) Assignee: CommScope, Inc. of North Carolina, Hickory, NC (US)

( * ) Notice: Subject to any disclaimer, the term of this patent is extended or adjusted under 35 U.S.C. 154(b) by 60 days.

(21) Appl. No.: 14/934,364

(22) Filed: Nov. 6, 2015

(65) Prior Publication Data
US 2016/0132532 A1    May 12, 2016

Related U.S. Application Data

(60) Provisional application No. 62/077,981, filed on Nov. 11, 2014.

(51) Int. Cl.
| | | |
|---|---|---|
| *G06K 9/00* | (2006.01) | |
| *G10L 15/22* | (2006.01) | |
| *G06F 17/30* | (2006.01) | |
| *G06Q 10/06* | (2012.01) | |
| *H04N 5/225* | (2006.01) | |
| *G06F 3/16* | (2006.01) | |
| *G06K 9/62* | (2006.01) | |

(52) U.S. Cl.
CPC .............. *G10L 15/22* (2013.01); *G06F 3/167* (2013.01); *G06F 17/30259* (2013.01); *G06K 9/00671* (2013.01); *G06Q 10/063118* (2013.01); *H04N 5/2251* (2013.01); *G06F 17/30365* (2013.01); *G06K 9/6215* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 6,212,286 B1 * | 4/2001 | Rott ...................... | G01J 5/0003 324/96 |
| 6,522,737 B1 | 2/2003 | Bartolutti et al. | |
| 6,784,802 B1 | 8/2004 | Stanescu | |
| 7,170,393 B2 * | 1/2007 | Martin ................. | G01R 31/023 235/440 |

(Continued)

OTHER PUBLICATIONS

International Search Authority, "International Search Report and Written Opinion from PCT Application No. PCT/US2015/059817", dated Feb. 24, 2016, pp. 1-12, Published in: WO.

*Primary Examiner* — Shervin Nakhjavan
(74) *Attorney, Agent, or Firm* — Fogg & Powers LLC

(57) ABSTRACT

Methods of identifying available connector ports on rack mounted equipment use an image capture device to capture an image of a front face of an equipment rack. The captured image is compared to at least one stored image. A patch cord insertion status of at least one connector port included on an item of equipment that is mounted on the equipment rack is then determined based at least in part on the comparison of the captured image to the at least one stored image.

14 Claims, 7 Drawing Sheets

(56) References Cited

U.S. PATENT DOCUMENTS

| | | | | |
|---|---|---|---|---|
| 7,374,101 B2 * | 5/2008 | Kaneko | G06K 7/10178 | 235/492 |
| 8,092,249 B2 * | 1/2012 | German | H04Q 1/138 | 439/489 |
| 8,248,208 B2 * | 8/2012 | Renfro, Jr. | H04B 5/02 | 340/10.1 |
| 8,618,912 B2 * | 12/2013 | Khozyainov | G01R 31/043 | 340/10.1 |
| 8,649,651 B2 * | 2/2014 | German | H04Q 1/138 | 385/147 |
| 2006/0148279 A1 * | 7/2006 | German | H01R 13/465 | 439/49 |
| 2006/0244677 A1 * | 11/2006 | Dempski | G02B 27/017 | 345/8 |
| 2007/0001691 A1 * | 1/2007 | Pereira | G01R 31/045 | 324/750.23 |
| 2008/0122579 A1 * | 5/2008 | German | H01R 13/6683 | 340/10.1 |
| 2010/0120264 A1 * | 5/2010 | Caveney | H04Q 1/136 | 439/49 |
| 2010/0210135 A1 * | 8/2010 | German | H04Q 1/138 | 439/491 |
| 2010/0316334 A1 * | 12/2010 | Kewitsch | G02B 6/3502 | 385/78 |
| 2011/0012712 A1 | 1/2011 | Khozyainov | | |
| 2011/0012727 A1 * | 1/2011 | Pance | G06F 13/4068 | 340/505 |
| 2011/0254504 A1 * | 10/2011 | Haddad | B60L 11/1827 | 320/109 |
| 2012/0185919 A1 * | 7/2012 | Macauley | H04Q 1/138 | 726/3 |
| 2013/0223684 A1 * | 8/2013 | Townend | G06Q 10/08 | 382/103 |
| 2014/0111346 A1 * | 4/2014 | Pinn | H04Q 1/09 | 340/691.6 |
| 2015/0254602 A1 * | 9/2015 | Hammelbacher | G06Q 10/087 | 705/28 |
| 2017/0018274 A1 | 1/2017 | German et al. | | |

* cited by examiner

MULTI-TIER INTELLIGENT INFRASTRUCTURE MANAGEMENT SYSTEMS FOR COMMUNICATIONS SYSTEMS AND RELATED EQUIPMENT AND METHODS

CROSS-REFERENCE TO RELATED APPLICATION

The present application claims priority under 35 U.S.C. §119 to U.S. Provisional Patent Application No. 62/077,981, filed Nov. 11, 2014, the entire content of which is incorporated herein by reference.

FIELD OF THE INVENTION

The present invention relates generally to communications systems and, more particularly, to infrastructure management systems that may be used to automatically manage various aspects of such communications systems.

BACKGROUND

Many businesses have dedicated communications networks that enable computers, servers, printers, facsimile machines and the like to communicate with each other and with remote locations via a telecommunications service provider. Such communications system may be hard wired through, for example, the walls and/or ceilings of a building using communications cables. Typically, these cables are so-called "Ethernet" cables that contain four twisted pairs of insulated wires, although in some cases fiber optic cables may be used instead. Individual connector ports such as RJ-45 style modular wall jacks are mounted in offices throughout the building. The cables provide a communications path from the connector ports in offices and other rooms and common areas of the building ("work area outlets") to network equipment (e.g., network servers, switches, etc.) that may be located in a computer room. Communications cables from external telecommunication service providers may also terminate within the computer room.

Commercial data center operations also use hard wired communications networks to interconnect hundreds or thousands of servers, routers, memory storage systems and other associated equipment. In these data centers, fiber optic communications cables and/or Ethernet cables are used to interconnect the servers, routers, memory storage systems and the like.

In the above-described office and data center communications systems, the cables that connect to end devices such as computers, servers, switches and the like may terminate into one or more communications patching systems that may simplify later connectivity changes. Typically, a communications patching system includes a plurality of "patch panels" that are mounted on one or more equipment racks. As is known to those of skill in the art, a "patch panel" refers to an inter-connection device that includes a plurality of connector ports on a front side thereof. Each connector port (e.g., an RJ-45 jack or a fiber optic adapter) is configured to receive the connector of a "patch cord," which is a communications cable that is terminated with a connector such as an RJ-45 or fiber optic plug on at least one end thereof. Another patch cord (or unterminated cable) may be connected to the reverse side of each connector port. Accordingly, each connector port on the patch panel may provide a communications path between a first cable that is plugged into the front side of the connector port and a second cable that is terminated into the reverse side of the connector port.

Connectivity changes are often made frequently in both office and data center communications systems, and these connectivity changes are typically implemented by rearranging the patch cord connections in the communications patching system. The patch cord interconnections are typically logged in a computer-based log, and this log is updated each time the patch cord connections are changed. A variety of "intelligent" patching systems are known in the art which have at least some capabilities to automatically log changes or additions to the patch cord connections. These systems, however, have various limitations in terms of cost, complexity and/or the ability to track all changes to the patch cord connections.

FIG. 1 is a schematic, greatly-simplified view of a conventional communications system 10 that is used to connect computers, printers, Internet telephones and other work area devices to network equipment that is located in a computer room 14. As shown in FIG. 1, a computer 20 or other work area device is connected by a patch cord 22 to a modular wall jack 24 that is mounted in a wall plate 26 in work area 12. A communications cable 28 is routed from the back end of the wall jack 24 through, for example, the walls and/or ceiling of the building, to the computer room 14. As there may be hundreds or thousands of work area wall jacks 24 in an office building, a large number of cables 28 may be routed into the computer room 14.

A first equipment rack 30 is provided in the computer room 14. A plurality of patch panels 32 are mounted on the first equipment rack 30. Each patch panel 32 includes a plurality of connector ports 34. Each cable 28 is terminated onto the back end of one of the connector ports 34 of one of the patch panels 32. A second equipment rack 30' is also provided in the computer room 14. A plurality of patch panels 32' that include connector ports 34' are mounted on the second equipment rack 30'. A first set of patch cords 50 (only two exemplary patch cords 50 are illustrated in FIG. 1) are used to interconnect the connector ports 34 on the patch panels 32 to respective ones of the connector ports 34' on the patch panels 32'. The first and second equipment racks 30, 30' may be located in close proximity to each other (e.g., side-by-side) to simplify the routing of the patch cords 50. In FIG. 1, each connector port 34, 34' comprises an RJ-45 jack. However, it will be appreciated that other types of connector ports may be used such as, for example, LC, SC, MPO or other fiber optic adapters (e.g., in data center communications systems).

A rack controller 36 is also mounted on each equipment rack 30, 30'. Each rack controller 36 includes a central processing unit ("CPU") 38 and a display 39. The rack controllers 36 may be interconnected with each other and with a system controller such as, for example, a system administration computer (not shown). The rack controller 36 may, for example, operate and gather data from intelligent tracking capabilities of the patch panels 32, 32'.

As is further shown in FIG. 1, network devices such as, for example, one or more network switches 42 and network routers and/or servers 46 are mounted, for example, on a third equipment rack 40. Each of the switches 42 may include a plurality of connector ports 44, and each network router and/or server 46 may include one or more connector ports. One or more external communications lines 52 are connected to at least some of the network devices 46 (either directly or through a patch panel). A second set of patch cords 70 connect the connector ports 44 on the switches 42 to respective ones of the connector ports 34' on the patch panels 32'. A third set of patch cords 54 may be used to interconnect other of the connector ports 44 on the switches 42 with connector ports 48 provided on the network routers/ servers 46. In order to simplify FIG. 1, only a single patch cord 70 and a single patch cord 54 are shown. The communications patching system of FIG. 1 may be used to connect each work area computer 20 or other device to the network switches 42, the network switches 42 to the network routers and servers 46, and the network routers/servers 46 to external communications lines 52, thereby establishing the physical connectivity required to give devices 20 access to both local and wide area networks.

The equipment configuration shown in FIG. 1 in which each wall jack 24 is connected to the network equipment 42, 46 through at least two patch panels 32, 32', is referred to as a "cross-connect" communications patching system. Cross-connect patching systems are also routinely used in data center operations. In a cross-connect patching system such as the system of FIG. 1, connectivity changes are typically made by rearranging the patch cords 50 that interconnect the connector ports 34 on the patch panels 32 with respective of the connector ports 34' on the patch panels 32'.

Communications system that are similar to the communications systems 10 of FIG. 1 are used in data centers to interconnect servers, switches, routers, memory storage units and the like.

Accurately tracking patch cord connections and equipment may become increasingly difficult as the size of communications systems increase. Modern data center operations may host tens of thousands of servers and other network equipment in a highly dynamic environment in which patching and equipment changes are being made almost constantly. When mistakes occur in recording such changes, numerous problems may arise such as lost connectivity between various devices, the issuance of work orders that cannot properly be completed, loss of planned levels of redundancy, etc. It can be very time-consuming to identify and correct these problems. Accordingly, improved infrastructure management systems are desired that may more accurately track equipment and patching connections.

SUMMARY

Pursuant to embodiments of the present invention, methods of identifying available connector ports on rack mounted equipment are provided in which an image capture device is used to capture an image of a front face of an equipment rack. The captured image is compared to at least one stored image. A patch cord insertion status of at least one connector port included on an item of equipment that is mounted on the equipment rack is then determined based at least in part on the comparison of the captured image to the at least one stored image.

In some embodiments, the image capture device may be an overhead mounted CMOS scanner. The method may further include tracking the available connector ports on each item of equipment that is mounted on the equipment rack based at least in part on the comparison of the captured image to the at least one stored image. The method may also include issuing an electronic work order that includes an instruction that a first patch cord be inserted into a first connector port on a first piece of equipment, where the first connector port is selected for inclusion in the electronic work order based at least in part on the determination that the patch cord insertion status of the first connector port is that the first connector port is available.

In some embodiments, the method may further comprise using the determined patch cord insertion status of the at least one connector port to confirm that a step in an electronic work order was completed. The method may also include determining a power cord insertion status of at least one power outlet based at least in part on the comparison of the captured image to the at least one stored image.

Pursuant to further embodiments of the present invention, patch cards are provided that comprise a cable, a connector on a first end of the cable, the connector including a latch. The patch cords further include an active RFID tag that is configured to transmit a first RFID signal in response to insertion of the connector into a mating connector. In some embodiments, the active RFID tag may be configured to transmit in response to activation of the latch. The active RFID tag may also be configured to transmit a signal in response to receiving an excitation signal from an external source In some embodiments, the active RFID tag may be further configured to transmit a second RFID signal in response to removal of the connector from the mating connector. The patch cord may also include second connector on a second end of the cable and a second active RFID tag that is configured to transmit a second RFID signal in response to insertion of the second connector into a second mating connector. In some embodiments, the cable may be a fiber optic communications cable. The latch may be a cantilevered latch or a push-on latch that is configured to releasably lock the connector within a plug aperture of the mating connector.

Pursuant to further embodiments of the present invention, methods of automatically tracking patch cord connections are provided in which a patch cord is inserted into a connector port. The insertion of the patch cord into the connector port is then detected using an image capture device. An RFID signal that includes an identifier for the patch cord is received, where the RFID signal is automatically transmitted by an active RFID tag that is included on the patch cord in response to the patch cord being inserted into the connector port. A determination is made that the patch cord was inserted into the connector port based at least in part on a time that the RFID signal was received.

In some embodiments, the active RFID tag may be configured to automatically transmit an RFID signal in response to depression of a plug latch on a first plug of the patch cord. The connector port may be a connector port of a device that does not include any hardware for tracking patch cord connections. The image capture device may be a controller that is mounted above the equipment rack that includes a piece of equipment that has the connector port, where the controller is configured to detect patch cord insertions into connector ports on the equipment by periodically capturing images of the equipment and comparing the captured images to stored images to determine the availability status of the connector ports included on the equipment mounted in the rack. The active RFID tag may be configured to only actively transmit in response to the active RFID tag being inserted into, or removed from, a connector port.

Pursuant to yet additional embodiments of the present invention, methods of tracking rack-mounted equipment in a communication system are provided in which an image capture device is used to capture an image of a front face of an equipment rack. The captured image is compared to at least one stored image. A determination is them made regarding the available slots in the equipment rack based at least in part on the comparison of the captured image to the at least one stored image. In some embodiments, the method may further comprise identifying the equipment by equipment type that is mounted in occupied slots of the equipment rack based at least in part on the comparison of the captured image to the at least one stored image.

Pursuant to still additional embodiments of the present invention, methods of tracking rack-mounted equipment in a communication system are provided in which an image capture device is used to capture an image of a front face of an equipment rack. The captured image is compared to at least one stored image. An item of equipment that is mounted in the equipment rack is then identified based on a comparison of the captured image to stored data. In some embodiments, identifying the item of equipment that is mounted in the equipment rack based on a comparison of the captured image to stored data may comprise identifying the item of equipment based at least in part on the comparison of the captured image to the at least one stored image.

DETAILED DESCRIPTION

Figure 1:
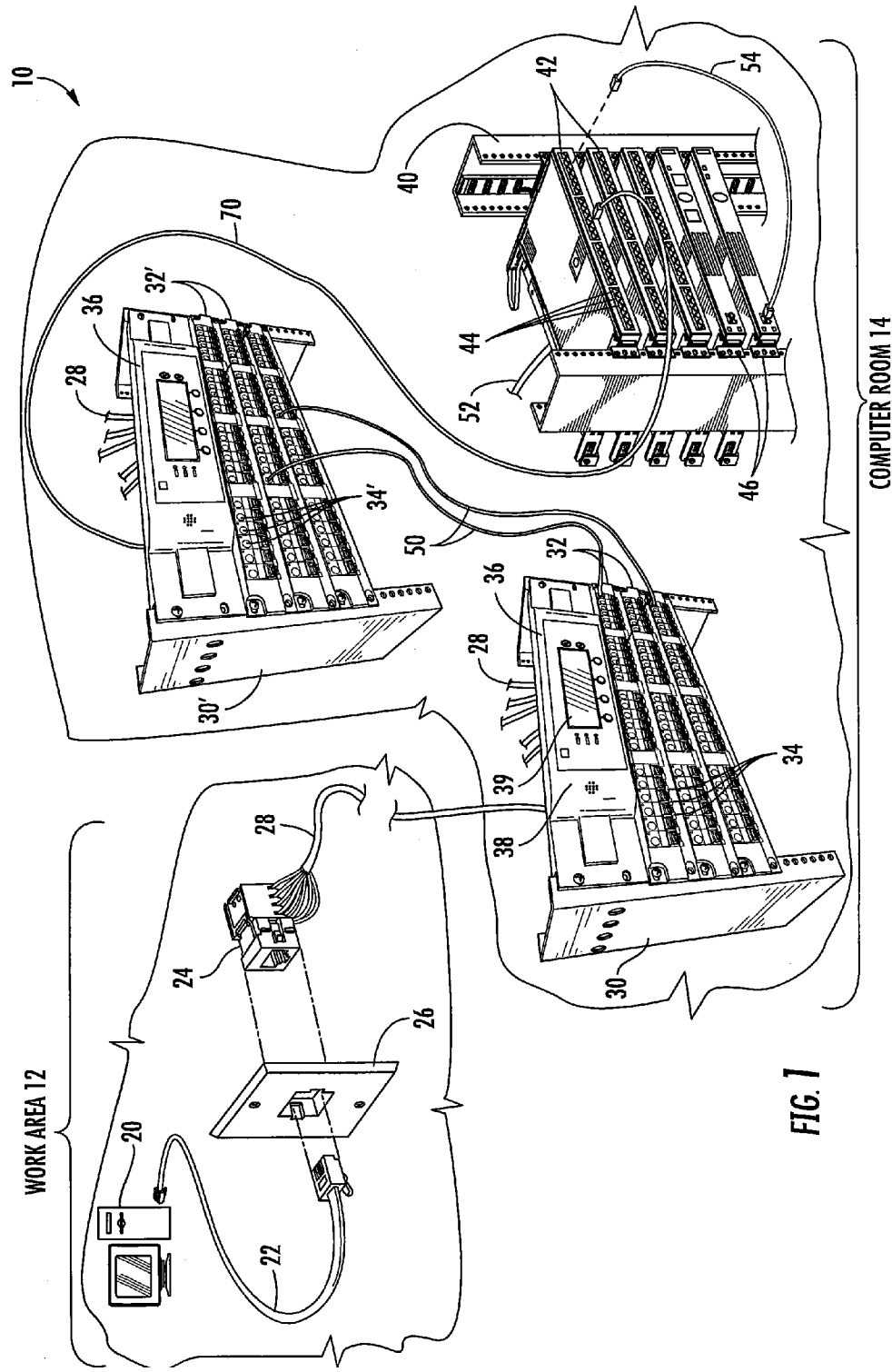
FIG. 1 is a schematic diagram illustrating how a conventional communications patching system may be used to connect network equipment work area devices.

Embodiments of the present invention provide intelligent infrastructure management systems for communications systems that may be used to automatically track, among other things, available connector ports on patch panels and network equipment, patch cord connectivity, the location of network equipment, available slots in equipment racks, environmental parameters, power outlets, manual control settings on power distribution equipment and the like. These intelligent infrastructure management systems may also be used in conjunction with electronic work orders to further automate the process of making changes to the communications system and to verify that the requested changes have in fact been successfully completed. The intelligent infrastructure management systems disclosed herein may be used with both intelligent and passive patching systems, and may automatically track patch cord connectivity to end devices that do not include any intelligence patching capabilities. The intelligent infrastructure management systems may be used with both new and pre-existing installations.

In some embodiments, intelligent network monitoring systems that include three-dimensional scanners may be mounted in the ceiling or in other appropriate locations in, for example, a computer room or a commercial data center. These systems may be positioned so that the three-dimensional scanners can scan the front face of rack-mounted network equipment and patch panels. These intelligent network monitoring systems may be used to automatically identify which connector ports are available on the patch panels and network equipment. This information may, in some embodiments, be incorporated into an electronic work order system and used to ensure that electronic work orders do not attempt to add new connections into connector ports that are already in use. Moreover, by tracking the available connector ports, the intelligent network monitoring systems may also provide a confirmation that electronic work orders were properly completed. The intelligent network monitoring systems may also be used to monitor other activities at the equipment racks such as, for example, the available slots in equipment racks, the types of equipment installed in each slot in the equipment racks, whether newly installed equipment has been plugged into the equipment rack power strips, manual settings on power distribution control systems and the like.

The intelligent network monitoring systems may comprise a first tier of functionality that is provided by the infrastructure management systems according to embodiments of the present invention. In further embodiments, the intelligent network monitoring systems may be used in conjunction with wearable or other portable devices such as intelligent glasses that technicians may use to assist in carrying out electronic work orders. These wearable/portable devices may provide a second tier of functionality. The use of portable/wearable devices such as intelligent eyeglasses may reduce or eliminate the need for displays on the equipment racks, rack managers and/or for intelligence on the patch panels such as LEDs and trace buttons that are commonly used today to assist technicians in properly executing equipment and patching changes.

The portable/wearable devices may also be used to implement other functionality that may be independent of the existing physical infrastructure. For example, the portable/wearable devices may be used in conjunction with the intelligent network monitoring systems to perform patch cord traces. Since this functionality is implemented using the intelligent network monitoring systems and the portable/wearable devices, patch cord tracing may not only be done between intelligent patch panels, but may also be performed at passive patch panels and/or with respect to network equipment such as network switches, servers and the like. In some embodiments, the portable/wearable device may have the capability to receive voice commands. This capability may be used to allow a technician to easily update system databases such as equipment databases and/or connectivity databases as tasks are completed (e.g., tasks on an electronic work order). Such voice commands may also be used to initially populate a database with existing connections. This capability may be very useful in situations where existing communications networks are upgraded to use the intelligent infrastructure management systems according to embodiments of the present invention. System software may also be programmed to use the three-dimensional scanning capabilities and/or an image scanner on the wearable device to confirm that the actions that a technician indicates have been performed via a voice command have in fact been performed. Thus, the systems according to embodiments of the present invention may have fewer mistakes in the system databases.

Pursuant to still further embodiments, a third tier of functionality may be provided in the form of intelligent patch cords that include active (i.e., battery-assisted) RFID tags. Each intelligent patch cord may be assigned a unique identifier that is stored electronically in the RFID tags mounted thereon. The intelligent patch cords may be used in conjunction with the intelligent network monitoring systems to automatically track changes to the patch cord connections. Each active RFID tag may be designed to transmit the unique identifier that is stored therein in response to predefined events such as, for example, the insertion of the a plug of the patch cord into a connector port or the removal of a plug of the patch cord from a connector port. In some embodiments, the depression of a latch on the plug may be used to trigger the active RFID tag to transmit the unique identifier stored therein. When used in conjunction with scanning technology included in the intelligent network monitoring systems, the infrastructure management system may determine which connector port receives the patch cord, and the active RFID tag may transmit an identifier for the patch cord, which may be correlated to the identified connector port. In this fashion, the infrastructure management system may automatically update a connectivity database as patching changes are made, and may also automatically confirm that electronic work orders have been successfully completed.

As discussed above, the intelligent infrastructure management systems according to embodiments of the present invention may be implemented as multi-tiered systems which may provide end users flexibility in deployment. In particular, the intelligent infrastructure management systems may be implemented in stages that provide increasing levels of capabilities while spreading the costs of the system upgrade out over time. The systems also allow end users who require less capabilities the option of only implementing one or more of the tiers. Moreover, the intelligent infrastructure management systems may be independent of the types of patch panels and network equipment that are used in the communications systems, and may thus allow end users to use any brand of equipment, and also may allow use of the systems in both new and existing installations.

Embodiments of the present invention will now be described with reference to the attached drawings, in which example embodiments are depicted.

Figure 2:
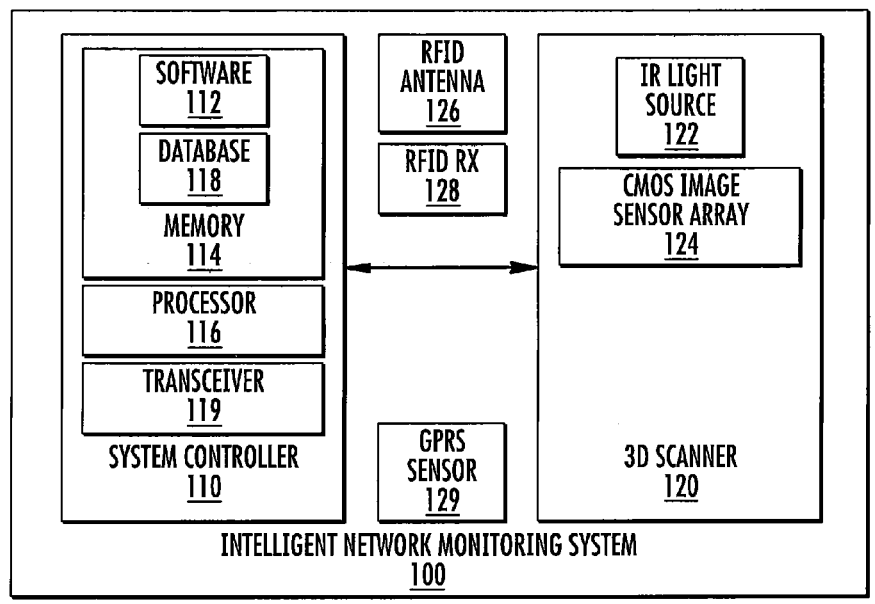
FIG. 2 is block diagram of an intelligent network monitoring system according to embodiments of the present invention.
Figure 3:
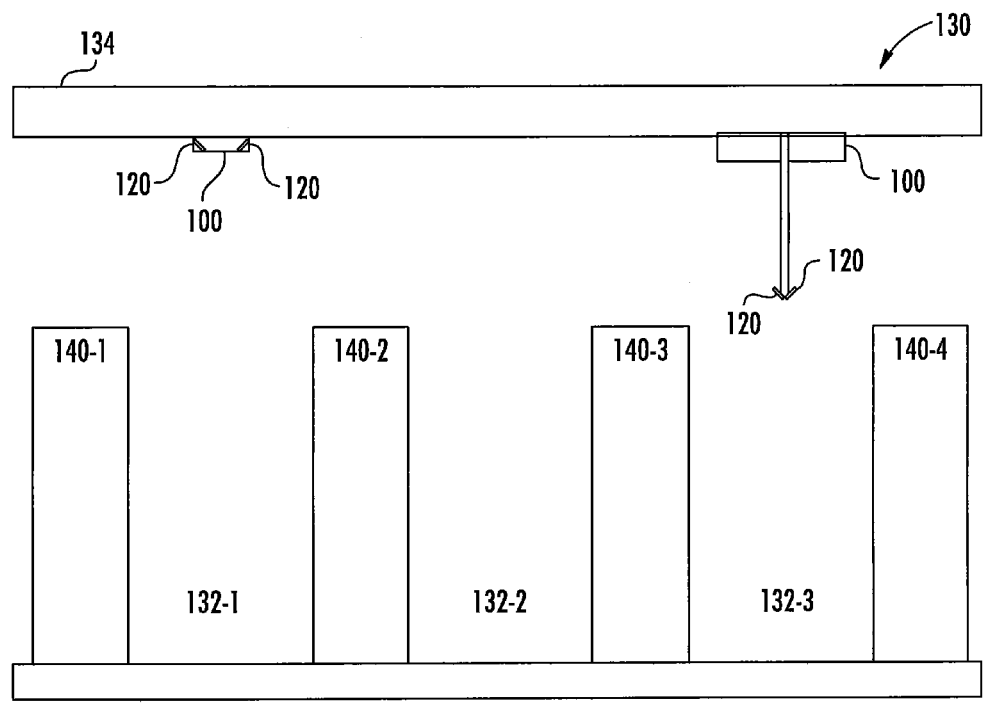
FIG. 3 is a schematic elevation view of a portion of a data center illustrating how a plurality of ceiling mounted intelligent network monitoring systems according to embodiments of the present invention may be used to monitor the equipment mounted on equipment racks on both sides of the aisles of the data center.
Figure 4:
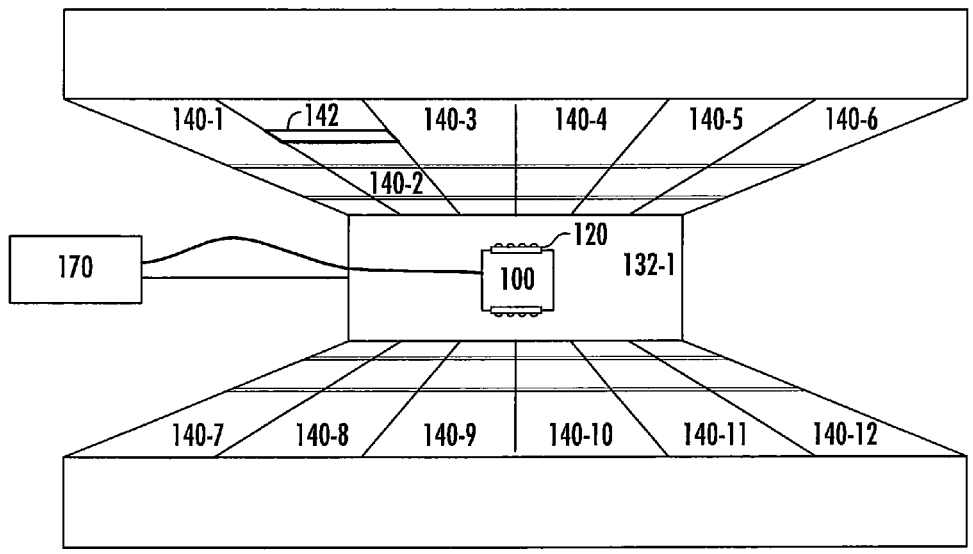
FIG. 4 is a schematic plan view illustrating how a pair of the intelligent network monitoring systems of FIG. 3 may be used to scan the equipment racks on both sides of an aisle.
Figure 5:
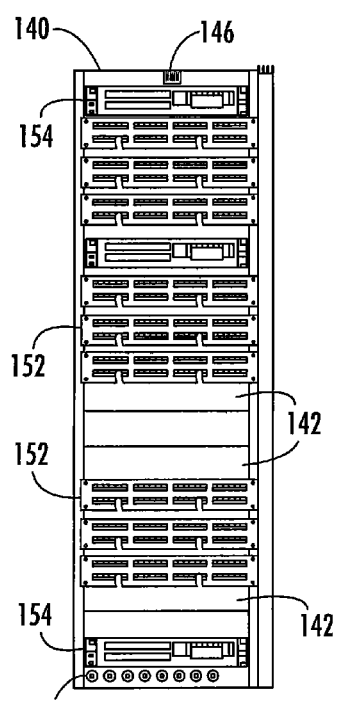
FIG. 5 is a front view of one of the equipment racks of FIG. 4.
Figure 6:
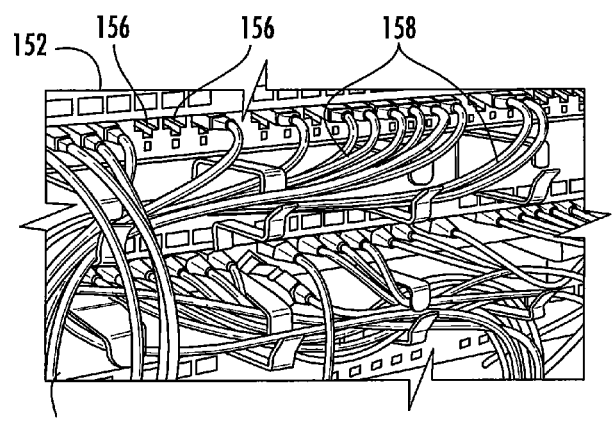
FIG. 6 is an enlarged view of a portion of FIG. 5 illustrating how patch cords may be plugged into some, but not all, of the connector ports thereof.

FIGS. 2-6 illustrate an intelligent network monitoring system 100 according to embodiments of the present invention and show how a plurality of these systems may be used to implement a first tier of infrastructure management functionality. In particular, FIG. 2 is block diagram of an intelligent network monitoring system 100. FIG. 3 is a schematic elevation view of a portion of a data center illustrating how a plurality of ceiling mounted intelligent network monitoring systems 100 may be used to monitor the equipment mounted on equipment racks on both sides of the aisles of the data center. FIG. 4 is a schematic plan view illustrating how a pair of the intelligent network monitoring systems 100 of FIG. 3 may be used to scan the equipment racks on both sides of an aisle. FIG. 5 is a front view of one of the equipment racks of FIG. 4. FIG. 6 is an enlarged view of a portion of FIG. 5 illustrating how patch cords may be plugged into some, but not all, of the connector ports thereof.

As shown in FIG. 2, the intelligent network monitoring system 100 includes a system controller 110 and a three-dimensional scanner 120. The system controller 110 and the three-dimensional scanner 120 are typically provided as a single integrated unit, but may alternatively be implemented as separate components. The three-dimensional scanner 120 includes an infrared or near infrared light source 122 (light in other wavelength ranges may be used) that is projected onto the area that is to be scanned. The light reflects from objects in the area that is scanned. Differences between the emitted light and the reflected light provide information regarding the location of objects in the scanned area. An array 124 of CMOS image sensors collects information regarding the reflected light (herein "the scan data") and feeds the scan data to the system controller 110. The provision of the infrared light source 122 also allows the intelligent network monitoring system 100 to operate under a wide variety of lighting conditions, including low lighting or even no lighting conditions. Software 112 that is stored in a memory 114 of the system controller 110 is run on a processor 116 and is used to process the scan data using various algorithms to create a three-dimensional rendition of the scanned area. The memory 114 may also include a database 118. The database 118 may include, two-dimensional (x, y) coordinates for various structures in the field of view of the scanner 120. The database 118 may also include stored image or scan data. Specific information that may be stored in the database 118 and how this information may be used is discussed in greater detail below. The system controller 110 may further include one or more transceivers 119 for wireless and or wired communications with other elements of the infrastructure management system.

The system controller 110 may control the times at which the three-dimensional scanner 120 performs scans and various parameters of these scans. System controllers 110 with three-dimensional scanners 120 are commercially available. While the intelligent network monitoring system 100 only includes a single three-dimensional scanner 120, as discussed below, in some embodiments each intelligent network monitoring system 100 may include a pair of three dimensional scanners 120 that are pointed in different directions. This may facilitate, for example, scanning the front faces of equipment that is mounted on both sides of an aisle in a data center or a computer room.

FIGS. 3-6 illustrate how a plurality of intelligent network monitoring systems 100 may be used to automatically identify available connector ports in a communications system. As shown in FIG. 3, a data center 130 may have many aisles 132 that are lined on each side with equipment racks 140. As shown in FIGS. 4-6, each equipment rack 140 may include a plurality of slots 142 that are configured to receive equipment 150. The equipment 150 may include patching equipment 152 such as patch panels and fiber optic connection trays and network equipment 154 such as network switches, servers, routers, memory storage devices and the like. Each piece of equipment 150 may include one or more connector ports 156 such as RJ-45 jacks or fiber optic adapters. The location and number of connector ports 156 provided varies based on the type of equipment, the manufacturer of the equipment and the model of the equipment. Patch cords 158 are used to connect a connector port 156 on one piece of equipment 150 with a connector port 156 on another piece of equipment 150, which may be on the same equipment rack 140 or a different equipment rack 140.

Referring again to FIG. 3, the aisles 132 typically comprise alternating "cold aisles" 132-1, 132-3 and "hot aisles" 132-2, where the front faces of each piece of equipment 150 face the cold aisles 132-1, 132-3. An intelligent network monitoring system 100 that includes a pair of three-dimensional scanners 129 is mounted over each of the cold aisles 132-1, 132-3. The intelligent network monitoring systems 100 may be mounted, for example, in the ceiling 134 of the data center 130. Each intelligent network monitoring system 100 may include a system controller 110 and a pair of scanners 120 (see FIG. 2 and discussion above). The two scanners 120 may be positioned to scan the front faces of the equipment racks 140 on the respective sides of the cold aisles 132-1, 132-3. Each three-dimensional scanner 120 may be positioned to scan a predetermined set of equipment racks 140. For example, as shown in FIG. 4, each three-dimensional scanner 120 may be configured to scan the front face of five adjacent equipment racks 140. In some cases the near infrared light source 122 and the CMOS sensor array 124 of each three-dimensional scanner 120 may be mounted on a pole that drops down from the ceiling so that the three-dimensional scanner may scan the front faces of the equipment racks 140 at a closer distance and/or more favourable viewing angle (see the intelligent network monitoring system 100 mounted above cold aisle 132-3 in FIG. 3).

In some embodiments, the intelligent network monitoring systems 100 may be mounted in or co-located with ceiling mounted light fixtures. Data centers typically have a carefully pre-planned layout where light fixtures are mounted along the center of each aisle 132. Light fixtures also necessarily have electrical power connections and may also have communications connections, particularly in cases where intelligent lighting systems are used to reduce energy costs. In some embodiments, the intelligent network monitoring systems 100 may use the electrical power and/or communications connections that are provided at each light fixture to avoid the need to run additional power or data connections. The light fixtures may comprise LED-based light fixtures that may be controlled via a controller.

The intelligent network monitoring systems 100 may operate as follows. The system controller 110 may instruct the three-dimensional scanner 120 to scan the front faces of the equipment racks 140 within the scanner's field of view. The scanner 120 may return the scan data to the system controller 110. The system controller 110 maps out a virtual three-dimensional (x, y, z) space (or, alternatively, a two-dimensional (x, y) space) based on the scan data. As noted above, the memory 114 may also include a database 118 of stored information. This database 118 may include, for example, the (x, y) coordinates for each slot 142 in each equipment rack 140, the type of equipment 150 mounted in each slot 142 in each equipment rack 140, the offset (x, y) coordinates of each connector port 156 included on each piece of equipment 150 (i.e., the (x, y) coordinates of each connector port 156 from a fixed location on each piece of equipment 150 such as the bottom, left hand front corner of the piece of equipment 150). The database 118 may also include scanned images of one or more connector ports 156 both with and without patch cords 158 plugged into the connector port 156 (e.g., such images may be provided for a representative connector port 156 on each different piece of equipment 150 that is mounted on the equipment racks 140).

The system controller 110 may compare the scan data that is returned from the three-dimensional scanner 120 to the stored information in the database 118 to make determinations regarding whether each connector port 156 on each piece of equipment 150 that is mounted on the equipment racks 140 within the field of view of the three-dimensional scanner 120 has or does not have a patch cord 158 plugged into it. In some embodiments, the portion of the scan data corresponding to the (x, y) coordinates of a particular connector port 156 on a particular piece of equipment 150 may be compared directly to the stored scanned images of connector ports with and without a patch cord inserted therein that are stored in the database 118 to determine if the connector port 156 is presently in use (i.e., it has a patch cord 158 plugged into it) or, alternatively, is available for use (i.e., it does not have a patch cord 158 plugged into it).

In other embodiments, more sophisticated techniques may be used. For example, one potential source of error in comparing the scan data to stored images in the manner described above is that the cable portion of a patch cord 158 that is plugged into a connector port 156 may be routed so that it is between another connector port 156 (which may be on the same piece of equipment 150 or a different piece of equipment 150) and the three-dimensional scanner 120. This cable may make it more difficult to determine if a patch cord plug is inserted in the connector port 156 of interest as it may partially block the view of the three-dimensional scanner 120 of the connector port 156. Various techniques may be used to reduce the likelihood that such patch cords 158 introduce errors in the form of false positives (i.e., vacant connector ports 156 that are identified as having a patch cord 158 plugged therein) or even false negatives (i.e., occupied connector ports 156 that are identified as being vacant). Such techniques may include, for example, using depth data (the z coordinate) to identify that an object (e.g., the cable of a patch cord 158) crosses in front of a connector port 156 and reducing or eliminating the contribution of scan data in such positions in the comparison operation that is used to make decisions regarding whether or not a patch cord 158 is inserted within a particular connector port 156. A variety of other techniques may be used. Additionally, standard cable routing techniques may also be employed at the equipment racks 140 to organize the cables of the patch cords 158 into bundles and to route the cables in spaces between pieces of equipment 150 in the racks 140 so that the patch cords 158 do not block access to the connector ports 156 (which may make it more difficult for technicians to insert and remove patch cords) and to reduce the possibility that the patch cords 158 generate false positive or false negatives during the monitoring for available connector ports 156.

In addition to monitoring for connector port availability, the intelligent network monitoring systems 100 may also monitor the equipment 150 that is mounted in each rack by comparing the scan data for the coordinates corresponding to each slot 142 in the equipment racks 140 to stored images of various different types of equipment 150 and to stored images of empty slots 142. Monitoring may be performed simply to identify empty slots 142 in the equipment racks 140 or may also further identify each piece of equipment 150 that is mounted in each occupied equipment rack slot 142 (e.g., to identify a piece of equipment 150 as a Systimax® GigaSPEED X10D 1100GS6 Category 6A U/UTP 24-port patch panel). By periodically capturing scan data of the front face of the equipment racks 140 and then correlating this data with information stored in the data base 118, the intelligent network monitoring systems 100 may automatically determine, for example, the slots 142 that are available in the equipment racks 140 and the connector ports 156 that are available in the equipment mounted in the equipment racks 140. This information may be dynamically updated as equipment and patching changes are performed.

The CMOS sensors that may be included in the CMOS sensor array 124 may detect some colors better than other colors. In particular, with some sensors, lighter colors may be detected better than darker colors. Thus, in some embodiments, connector ports and/or patch cord plugs may be colored to be more "visible" to the CMOS sensor array 124. Moreover, the connector ports 156 and the patch cords 158 may be formed of different colored materials to highlight the contrast between the two. In some embodiments, the patch cords and/or connector ports may be a distinct color (e.g., bright pink) that other vendors are unlikely to use. While it is likely that the end user may have equipment from multiple vendors such that not all of the patch cords and/or connector ports will be the same color, the use of such a distinct color on a substantial percentage of the cords or equipment may still improve overall performance of the intelligent network monitoring systems 100.

As discussed above with reference to FIG. 2, the intelligent network monitoring system 100 includes an infrared light source 122 that projects infrared (or near infrared) light onto the area that is to be scanned so that the CMOS images sensors 124 may detect the reflected light to obtain the scan data. The infrared light source 122 may also, in some embodiments, be used to track movement of persons in the data center, as infrared light sources and CMOS sensors can very effectively identify and track such movement. For example, in some embodiments, the intelligent network monitoring system 100 may be programmed to track movement of technicians in the aisles of a data center and to identify equipment racks that a technician spends a minimum amount of time in front of. This may serve as an indicator that a technician was likely making changes to the identified equipment rack. This information may be used to improve the efficiency of the intelligent network monitoring system 100. For example, the intelligent network monitoring system 100 may be programmed to collect scan data on one or more equipment racks based on a determination that a person spent time adjacent the one or more equipment racks.

Referring again to FIG. 2, in some embodiments, some or all of the intelligent network monitoring systems 100 may also include a built-in RFID antenna 126 and RFID receiver 128. The built-in RFID antenna 126 and RFID receiver 128 may be used in conjunction with active RFID tags that are provided on patch cords, as will be discussed below with reference to FIGS. 9-11.

Referring again to FIG. 2, in still further embodiments, the intelligent network monitoring systems 100 may also include a thermal imaging unit 129 that may be used to monitor temperatures at various locations on the equipment racks 140. For example, U.S. Provisional Application Ser. No. 61/899,402, filed Nov. 4, 2013, and U.S. patent application Ser. No. 14/520,563, filed Oct. 22, 2014, disclose methods and systems for using overhead mounted sensors that collect temperature data along racks of communications equipment and send the collected temperature data to a centralized location for monitoring and analysis. The thermal sensors may comprise, for example, Grid Pattern Infrared ("GPIR") sensor arrays, which are two-dimensional arrays of sensors, where each sensor may have much narrower field of view cone (or other shaped pattern) than infrared sensors used in traditional applications such as motion detection. Two examples of GPIR sensors are Panasonic's 8×8 Grid-Eye sensor array (part #AMG8831) and Melexis' 16×4 sensor array (part #MLX90620). The entire content of U.S. Provisional Application Ser. No. 61/899,402 and of U.S. patent application Ser. No. 14/520,563, filed Oct. 22, 2014 are incorporated herein by reference as if set forth in their entireties.

The information collected by the intelligent network monitoring systems 100 according to embodiments of the present invention may be provided to, for example, a Data Center Infrastructure Management ("DCIM") system 170. One example of such a DCIM system 170 is the DCIM system available from iTracks®. Additionally or alternatively, the information collected by the intelligent network monitoring systems 100 may be provided to any automated infrastructure management system that is used to track patch cord connections. Likewise, in embodiments which collect temperature data using a thermal sensor 129, the equipment tracking and temperature data may likewise be provided to the DCIM system 170. This facilitates using the information collected and/or generated by the intelligent network monitoring systems 100 to improve the electronic work order process, to control heating and cooling systems, to update asset databases and/or to identify errors in connectivity databases.

In some embodiments, the intelligent network monitoring systems 100 may be networked together and/or connected to the DCIM system 170 via wired connections, as wireless connectivity may not always be available. However, it will be appreciated that wireless connections (e.g., WiFi or broadband) may also be used. The intelligent network monitoring systems 100 may connect to a central controller that aggregates the data received therefrom or may connect directly to the DCIM system 170 or some other appropriate controller.

The intelligent network monitoring systems 100 may also be used to collect additional information regarding the equipment racks 140 in their field of view and changes that occur at those equipment racks 140. As an example, the equipment racks 140 typically have power strips 144 (see FIG. 5), and any active equipment 150 that is mounted in a particular equipment rack 140 is plugged into the power strip 144 for that rack 140. These power strips 144 are typically located in the front of the equipment rack 144 for easy access by technicians, and hence may be viewable by the intelligent network monitoring systems 100. While it will typically not be possible to match a particular power cord that is plugged into one of these power strips 144 to a particular piece of equipment 150 in the rack 140, it is possible to detect changes to the number of power cords that are plugged into a power strip 144. Thus, for example, the intelligent network monitoring systems 100 may be programmed to detect changes in the number of power cords that are plugged into a power strip 144, and this information may be used as an additional confirmation that work orders involving, for example, the installation of new equipment 150 have been properly executed (as part of installing a new piece of active equipment 150 is connecting the piece of equipment 150 to an electrical power source). For example, if an electronic work order is issued that calls for the installation of a new server 154 in slot 12 of a particular equipment rack 140, the intelligent network monitoring system 100 that monitors the equipment rack 140 at issue may detect the fact that a server 154 has been installed into slot 12 (and, in some embodiments, may identify the type of server 154 installed), thereby providing additional confirmation that the work order has been completed. The intelligent network monitoring system 100 may also identify whether or not an additional power cord has been plugged into the power strip 144 for the equipment rack 140 at issue. This may provide an indication as to whether or not the newly installed server 154 has been plugged in and is ready for use.

As discussed above, the intelligent network monitoring systems 100 may be used to identify which specific connector ports 156 on each piece of equipment 150 are available. This may be important because many if not most electronic (or paper) work orders request that a technician plug patch cords 158 into open connector ports 156 in order to connect new equipment 150 to the network or to change the connectivity with respect to existing equipment 150. If inaccuracies exist in a connectivity database of the DCIM 170 (the connectivity database may be an electronic database in which the current patch cord and cabling connections are stored for the communications system), then work orders may specify that a patch cord 158 be plugged into a connector port 156 that already has a patch cord 158 plugged into it. When a technician attempts to execute such a work order, he or she will realize that a mistake has occurred, and will not be able to execute the work order until a new, corrected work order is issued.

Moreover, the intelligent network monitoring systems 100 according to embodiments of the present invention may be used on equipment 150 that does not have any "intelligence" such as circuitry for tracking patch cord connections or the like. Thus, pursuant to embodiments of the present invention, mechanisms for automatically identifying available connector ports 156 are provided that may be completely independent of the underlying patching and network equipment 152/154.

The intelligent network monitoring systems 100 may also be used to track the completion of electronic work orders. For example, at the end of some period of time (e.g., the end of each day) the DCIM system 170 or some other control computer or function may review the electronic work orders that technicians indicated were completed during the day to identify the connector ports 156 that should have had a patch cord 158 connected thereto or removed therefrom, the slots 142 in the equipment racks 140 that should have had equipment 150 installed therein or removed therefrom and other various changes to the communications system that can be sensed by the intelligent network monitoring systems 100. Scan data collected from the intelligent network monitoring systems 100 may then be reviewed to see if all of the activities that were supposed to have happened in fact occurred. If discrepancies exist (e.g., a particular connector port 156 was supposed to receive a patch cord 158 pursuant to a work order that was allegedly completed, but the scan data indicates that no patch cord 158 is present in that connector port 156), then a technician may be assigned to investigate the discrepancy. This may provide a convenient way to identify any mistakes that occur in the execution of electronic work orders at an early stage before those mistakes give rise to more serious problems.

In some embodiments, the intelligent network monitoring systems 100 may also be used to automatically track patch cord connections. This may be accomplished by having technicians effect patching connection changes in a predetermined scheme. For example, if a technician always completes the addition of a new patch cord connection by first inserting the first end of the new patch cord 158 into a first connector port 156 and then inserting the second end of the new patch cord 158 into a second connector port 156 before effecting any other patch cord changes, the detection of consecutive (in time) insertions of ends of patch cords 158 into two connector ports 156 may be understood to represent the addition of a new patch cord 158 between the two identified connector ports 156. The management software in the DCIM 170 may thus infer that these two detected patch cord insertions indicate that a patch cord 158 now connects the two identified connector ports 156. As another example, technicians may be trained to always effect a change to a patch cord connection by first removing the end of the patch cord 158 that is impacted by the connectivity change from the connector port 156 it is plugged into and then immediately plugging that end of the patch cord 158 into another connector port 156 before performing any other patch cord changes. Thus, the detection of removal of a patch cord 158 from a first connector port 156 followed immediately in time by the insertion of an end of a patch cord 158 into another connector port 156 may be inferred to indicate that the two detected changes involved the same patch cord 158. Thus, if patching changes are applied in an orderly fashion in practice, the information gathered by the intelligent network monitoring systems 100 regarding the insertions and removals of patch cords 158 from connector ports 156 (along with the time at which those patching changes occurred) may be used to automatically track the patch cord connections. Notably, this automatic tracking may be performed on equipment 150 that does not have intelligent patch cord tracking capabilities, as the patch cord insertions and removals are detected by the intelligent network monitoring systems 100 which are independent of the equipment 150 that is mounted in the equipment racks 140.

Pursuant to further embodiments of the present invention, the intelligent infrastructure management system may further include interactive intelligence in the form of, for example, portable/wearable devices that are used by technicians to facilitate work order implementation, perform automatic patch cord connectivity tracking and various other functions. The use of such portable/wearable devices may be particularly useful with respect to equipment that does not include intelligent tracking capabilities. For example, a large base of non-intelligent patch panels have been installed in both office networks and in data centers that do not have any capability to track patch cord connections, perform patch cord traces and/or guide technicians that are performing changes to the patch cord connections. When technicians execute patching changes at these non-intelligent patch panels, they must update the connectivity database later, typically by entering the completed patching changes into the connectivity database using, for example, a computer. Moreover, the non-intelligent patch panels are incapable of providing the technicians any guidance when the technicians make changes to the patch cord connections during, for example, the completion of a work order. The portable/wearable devices that may be integrated into the infrastructure management systems according to embodiments of the present invention may be used to provide intelligent patching capabilities at these non-intelligent devices and to guide technicians when carrying out electronic work orders.

Figure 7:
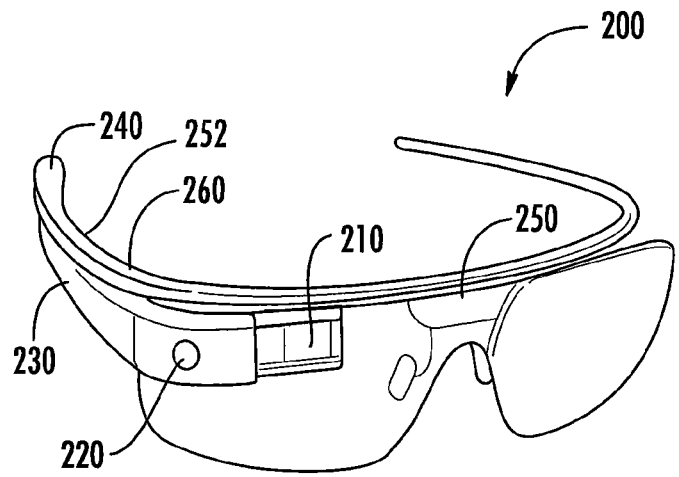
FIG. 7 is a schematic perspective view of a pair of intelligent eyeglasses that may be integrated into the intelligent infrastructure management systems according to embodiments of the present invention.

In some example embodiments, the above-referenced portable/wearable devices may comprise, for example, intelligent eyeglasses such as Google Glass® glasses or other portable or wearable scanning equipment. FIG. 7 is a schematic perspective view of a pair of intelligent eyeglasses 200 that may provide interactive intelligence that facilitates automation of patching changes and related updates to the connectivity database for the system.

The intelligent eyeglasses 200 may wirelessly communicate with an associated controller using, for example, Bluetooth communications or Near Field Communication (NFC) technology. The controller may comprise, for example, an equipment rack mounted controller such as a rack controller or a controller of one of the intelligent network monitoring systems 100. The controller may be in communication with a system administration computer, an equipment database and/or a connectivity database via a wired or wireless communications link.

As shown in FIG. 7, the intelligent eyeglasses 200 include a display 210 that the technician can view through one of the lenses of the intelligent eyeglasses 200. The eyeglasses 200 may also include a camera 220, a processor 230, a wireless communications module 240 such as, for example, a Bluetooth transceiver and input/output devices such as, for example, a microphone 250 and a speaker 252.

The camera 220 may be used to scan equipment racks 140 that are in its field of view. The images captured by the camera 220 may be transmitted via the wireless communications module 240 to a controller where they may be compared in real time with stored images and other stored information so that the intelligent eyeglasses 200 can identify the equipment 150 that is in the field of view of the camera 220. The controller may be, for example, the system controller 110 of an intelligent network monitoring system 100.

In some embodiments, each equipment rack 140 may include a bar code or other identifier 146 (see FIG. 5) thereon. The camera 220 captures an image of the identifier 146 and forwards this image to, for example, the system controller 110 of an intelligent network monitoring system 100. The system controller 110 performs a look up operation to identify the equipment rack 140 on which the identifier 146 is mounted. After the equipment rack 140 is identified, the system controller 110 may look up information regarding the equipment 150 that is mounted thereon, including the types of equipment 150 mounted on the rack, the slots 142 where each specific item of equipment 150 is mounted in the equipment rack 140, and the number and locations of the connector ports 156 on each piece of equipment 150 in the rack 140. This information may then be used, for example, to guide the technician through various operations and/or to automatically track changes to the patch cord connections, as will be discussed below.

By way of example, a technician may receive an electronic work order which requires installing a server 154 in an open slot 142 on a particular equipment rack 140, and then connecting a patch cord 158 between a connector port 150 on this server 154 and a specific connector port 156 on a specific patch panel 152. Once the technician completes the work order, the technician may, for example, use a voice command to indicate that the work order has been completed. The intelligent eyeglasses 200 may receive the voice command through the microphone 250 and the processor 230 may process this voice command and then transmit a message via the wireless communications module 240 to the transceiver 119 of the system controller 110 that indicates that the technician has completed the electronic work order. In response to receiving this message, the system controller 110 may send a message to the DCIM system 170 via, for example, a wired connection, and the DCIM system 170 may then update the equipment database to reflect that the new server 154 has been installed, and may update the connectivity database to reflect the newly installed patch cord connection between the new server 154 and the specified connector port 156 on the specified patch panel 152.

The intelligent eyeglasses 200 may also, for example, issue a command instructing the technician to look at the newly installed server 154. The camera 220 may then capture an image of the equipment rack 140 that includes the new server 154 and this image may be wirelessly transmitted by the intelligent eyeglasses 200 to the system controller 110. The system controller 110 may then process the image to confirm that the new server 154 has in fact been installed in the correct slot 142 in the equipment rack 140 and/or that the server 154 that was installed was the correct type of server. This may be accomplished by comparing the image of the new server 154 that is captured by the intelligent eyeglasses 200 with, for example, images stored in the database 118 of the system controller 110. These operations may be used to confirm that the technician properly executed the electronic work order and this confirmation may be obtained immediately after the tasks specified in the work order are completed. In this manner, any mistakes that occur in executing the work order may be identified and corrected immediately before they lead to connectivity failures and when the mistakes are the easiest to correct. The intelligent eyeglasses 200 may also issue a command instructing the technician to look at the connector port 156 on the specified patch panel 152 that the work order specified that the patch cord 158 from the server 154 should be connected to. The camera 220 may then capture an image of the patch panel 152 and send it to the system controller 110 for comparison to pre-stored images in the database 118 to confirm that a patch cord 158 is in fact plugged into the specified connector port 156.

Figure 8A:
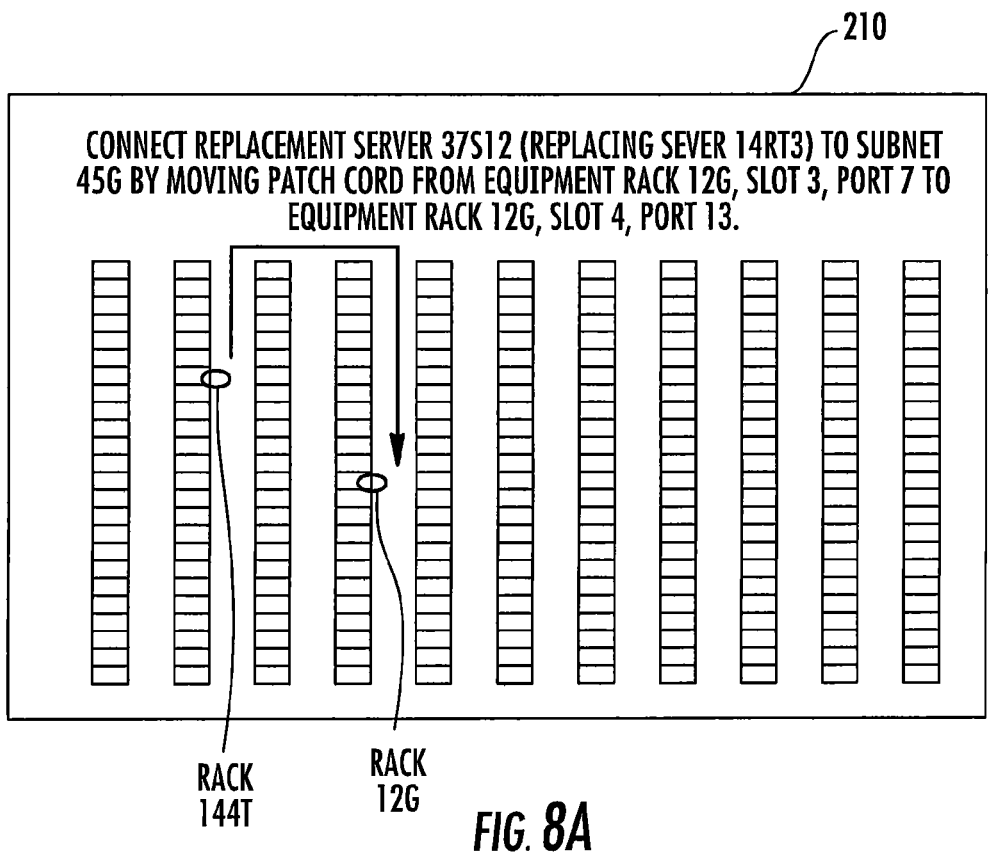
FIGS. 8A-8C illustrate information that may be displayed on a display device of a pair of intelligent eyeglasses that may be included in the infrastructure management systems according to embodiments of the present invention.
Figure 8B:
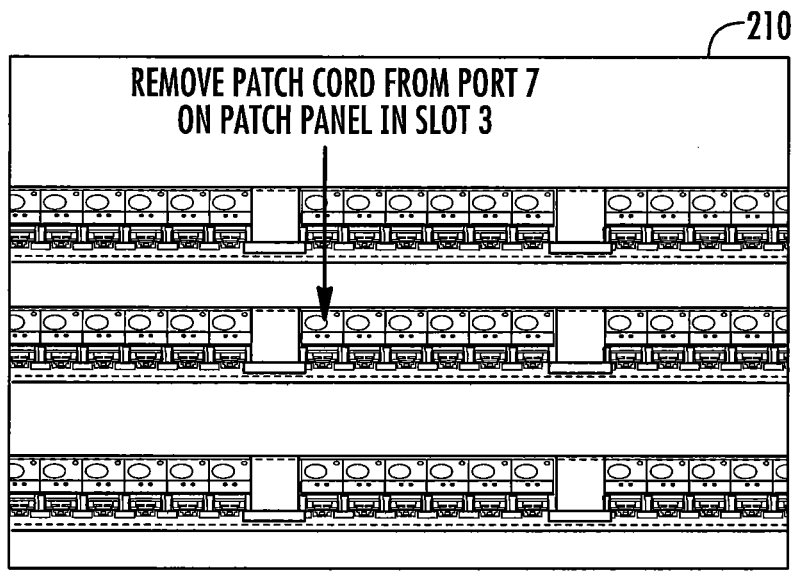
Figure 8C:
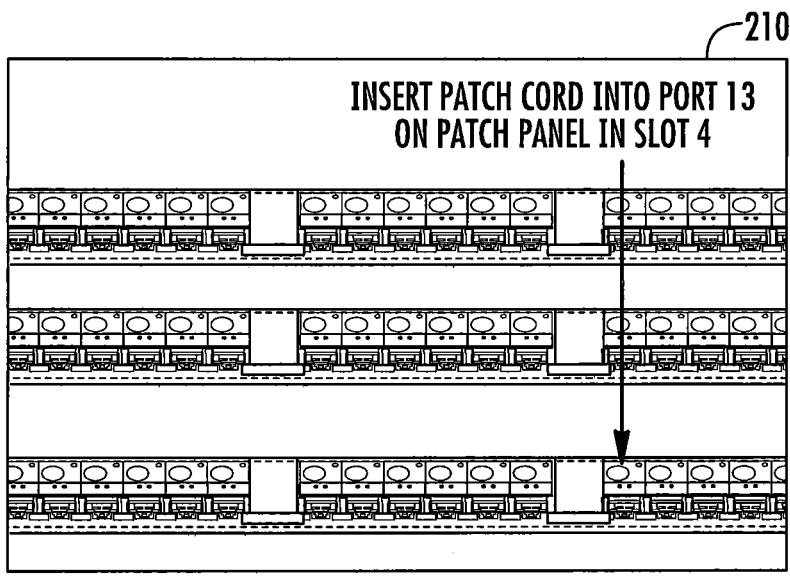

The display 210 on the intelligent eyeglasses 200 may be used to display instructions and/or provide guidance by visual indication during the implementation of work orders or other activities. For example, as shown in FIGS. 8A-8C, an electronic work order may be displayed to a technician on the display 210 in a step-by-step manner to facilitate the completion thereof. As shown in FIG. 8A, initially a description of the task that is specified in the electronic work order may be rendered on the display 210. Additionally, a map of the data center 130 may also be rendered on the display 210 with the current location of the technician identified (namely, beside Rack 144T) as well as the location where the equipment 150 is that is involved in the first step in the electronic work order (namely, Rack 120). This is possible because, as discussed above, the intelligent eyeglasses 200 can read the bar codes or other identifiers 146 on the equipment racks 140 to determine the technician's current location in the data center 130.

Once the technician arrives at the location of the equipment 150 that is involved in the first step in the electronic work order, the display 210 on the intelligent eyeglasses 200 may then update to list the first step of the work order and to specifically identify the item of equipment 150 and/or connector port 156 that that is involved in the first step, as is shown in FIG. 8B. In the example of FIGS. 8A-8C, the electronic work order specifies a patching change where a first end of the patch cord that is plugged into connector port 7 on the patch panel in slot 3 of an equipment rack 140 is to be removed and inserted into connector port 13 of the patch panel in slot 4 of the same equipment rack 140. As is readily apparent from FIGS. 8B and 8C, the electronic work order may be presented to the technician on the display 210 in a step-by-step fashion with visual indicators that show the technician exactly which connector ports 156 are involved in the patching change. This visual indication may be very useful when the electronic work order specifies operations that are performed on equipment 150 that does not have LED indicator lights or other visual indicia that may help direct the technician to the correct connector port 156 such as network equipment 154 (e.g., switches, servers, etc.) and non-intelligent patch panels 152. The provision of the visual indicia may also eliminate the need for LEDs or other indicator lights that are routinely provided on intelligent patch panels, thereby reducing the costs for the end user.

In some embodiments, as the technician completes each step in an electronic work order he may use a voice command such as "STEP COMPLETED" to notify the intelligent eyeglasses 200 that the step has been completed. The intelligent eyeglasses 200 may receive these voice commands via the microphone 250, where the voice command is processed by the processor 230. In response to the voice command, the intelligent eyeglasses 200 may render the next step in the electronic work order on the display 210, and/or may also be used as a prompt for the intelligent eyeglasses 200 to transmit a message (e.g., to the system controller 110) that causes an update to the connectivity database to reflect that the step of the work order has been completed.

In some embodiments, the intelligent eyeglasses 200 may be configured to "sense" the insertion of patch cords 158 into connector ports 156 in the rack mounted equipment 150 and the removal of patch cords 158 from the connector ports 156 in the rack mounted equipment 150, and to then transmit information regarding the detected patch cord insertions and removals to another controller such as the system controller 110 which may forward this information to the DCIM system 170. For example, the intelligent eyeglasses 200 may scan the equipment rack 140 at issue after each step in a work order is completed and see if, for example, a patch cord 158 has been plugged into the correct connector port 156 or removed from the correct connector port 156. If so, the intelligent eyeglasses 200 may assume that the correct patch cord 158 was plugged into, or removed from, the connector port 156 at issue and automatically update the system databases to indicate that the electronic work order was completed. In order to have improved accuracy, a combination of automatic sensing and received voice (or other) commands may be used. Moreover, if the automatic sensing does not detect that the electronic work order has been properly executed, an error message may be provided to the technician (e.g., in the form of an audible error message or an error message that is displayed on the display 210).

In embodiments where the system automatically tracks changes to the patch cord connections, the intelligent eyeglasses 200 may also be used to implement "trace button" functionality. In particular, some intelligent patch panels 152 that are in use today include a trace button and an LED (or other indicator light) adjacent to each connector port 156. When these intelligent patch panels 152 are used in a so-called "cross-connect" patching configuration where both ends of the patch cords 158 are plugged into patch panels 152, a technician may press the trace button at a first connector port 156 and the system will automatically look up the connectivity information for the patch cord 158 that is plugged into the connector port 156 and then light the LED at the connector port 156 that the far end of the patch cord 158 is plugged into. In this fashion, a technician can easily "trace" the patch cord 158 to determine where the far end of the patch cord 158 is located. Since the patch cords 158 are typically bundled and often hidden from view when routed through and between equipment racks, this trace function can greatly simplify the process of physically tracing a patch cord 158.

In embodiments where the infrastructure management system automatically tracks changes to the patch cord connections, the intelligent eyeglasses 200 may be used in conjunction with the connectivity database to implement the same functionality. In particular, the intelligent eyeglasses 200 may be programmed to use the camera 220 to sense when the technician touches a connector port 156 with his or her finger. To avoid accidental invocation of the trace functionality, the intelligent eyeglasses 200 may be programmed so that the trace functionality is only invoked after the technician enters a voice command (e.g., states "PERFORM TRACE" into the microphone 250). After invoking a trace command, the technician may touch a connector port 156 that has a patch cord 158 plugged into it. The camera 220 may capture one or more images of the technician touching a specific connector port 156, process these images to determine that they indicate that the technician has touched a connector port 156, and then correlate the image(s) with information in a database (e.g., the database 118 of a system controller 110 that the intelligent eyeglasses 200 is in communication with) that lists the type of equipment 150 that is stored in each slot 142 in the equipment rack 140 at issue, and the locations of the connector ports 156 on that equipment 150, in order to identify the connector port 156 that the technician touched. The system controller 110 may then access the connectivity database to determine the patch cord connectivity information for the patch cord 158 that is inserted into the connector port 156 that the technician touched. The system controller 110 may then forward this information to the intelligent eyeglasses 200, and information may be rendered on the display 210 of the intelligent eyeglasses 200 that notifies the technician (e.g., visually) as to the connector port 156 that the far end of the patch cord 158 is plugged into. In this fashion, the intelligent eyeglasses 200 may provide patch cord tracing functionality without the need for the inclusion of trace buttons next to the connector ports 156. This advantageously can allow extending tracing functionality to network switches, servers and other devices that typically do not include trace buttons.

In still other embodiments, bar codes or other optical identifiers may be provided on each patch cord 158 (e.g., on the strain relief boot of each plug) and on each connector port 156. Bar codes that have the same identifier are placed on both plugs of any given patch cord 158. In such embodiments, the intelligent eyeglasses 200 may simply scan the bar code on the connector port 156 and the bar code on the patch cord 158 each time a patching change is performed, and forward this information to the connectivity database. Since both ends of a given patch cord 158 have the same identifier, the infrastructure management system can readily determine the two connector ports 156 that are connected by each patch cord 158. Thus, while such a system may require the use of a large number of barcodes, it provides a convenient way for automatically tracking patch cord connections. One caveat is that it may be necessary that the patch cords are arranged so that the camera 220 is able to capture each barcode on the patch cords 158 and on the connector ports 156.

The intelligent eyeglasses 200 (or other portable/wearable device) may perform a variety of functions including (1) confirming that electronic work orders have been correctly competed (i.e., that patching changes and equipment changes were completed), (2) automatically tracking changes to the patching connections, (3) providing instructions and/or visual indicia to technicians that assist in carrying out electronic work orders, and (4) performing patch cord tracing operations.

The voice command capabilities of the intelligent eyeglasses 200 may also be used to perform a variety of additional functions. For example, as a technician adds new patch cords 158, removes patch cords 158 or changes the connectivity of patch cords 158, he or she can narrate into the microphone 250 each action that is completed. This narration may follow a predefined script that may be used to automatically update the connectivity and/or equipment databases. The intelligent eyeglasses 200 may also provide the technician visual or audible indication as to each update that is being made to ensure that mistakes are not made in the data entry process.

As another example, when a pre-existing communications system is upgraded to include the intelligent infrastructure management systems according to embodiments of the present invention, the equipment 150 and patch cords 158 will already be in place. In order for the infrastructure management system to be used to automate operation of this pre-existing communications system, it typically will be necessary to populate the equipment and connectivity databases of a DCIM system 170 or other control system. This process is typically a highly-time consuming, labor-intensive task that may take days or even weeks to complete. Using voice commands and the intelligent eyeglasses 200 and intelligent network monitoring systems 100, a technician can simply recite the necessary information verbally and have it automatically entered into the equipment and connectivity databases. For example, the technician can, for each equipment rack 140, narrate the type of equipment 150 that is included in each slot 142 in the equipment rack 140 in order to populate the equipment database. Additionally, the camera on the intelligent eyeglasses 200 may also take a picture of each equipment rack 140 and compare the picture to pre-stored images of different types of equipment 150 as a means of verifying that the technician is correctly entering the equipment types into the equipment database.

Voice commands may likewise be used for a number of additional activities including, for example, displaying the pending work orders associated with a particular piece of equipment 150 or a particular equipment rack 140, performing patch cord tracing operations, and/or locating certain types of equipment 150 or specific pieces of equipment 150.

Pursuant to yet further embodiments of the present invention, the infrastructure management systems may include automated patch cord connectivity tracking hardware through the use of active RFID tags. Such capabilities may provide a third tier of functionality to the infrastructure management system. When combined with the use of the image-taking capabilities provided in the first and second tiers as discussed above, the use of active RFID tags may provide a reliable method of tracking patch cord connections to both intelligent and non-intelligent equipment 150.

An RFID tag refers to an electronic tag that typically includes an integrated circuit chip and a radio frequency ("RF") antenna. Information may be stored in a memory of the integrated circuit chip such as, for example, a unique identifier. The RFID tag may be "excited" to cause the tag to wirelessly transmit the information stored in the memory through the RF antenna. This information may then be received at a remote RFID transceiver. RFID tags often have an adhesive backing so that they can be readily adhered to various articles such as equipment, items stored in a warehouse, or even consumer merchandise. As the identifier that is transmitted by each RFID tag is typically unique to that RFID tag, each identifier may be used to identify a particular item, and hence the RFID tags may be used to track the location of specific items.

Both passive and active RFID tags are known in the art. A passive REID tag refers to an RFID tag that does not have its own power source. Passive RFID tags are designed to receive an excitation signal that is transmitted by an RFID transmitter and to use the energy in this excitation signal as a power source for transmitting a responsive signal that includes the information stored in the memory of the RFID tag. Passive RFID tags may be very inexpensive, but have a very limited transmission range and typically the RFID transmitter must be very close to a passive RFID tag in order to provide sufficient energy to the tag to allow it to transmit a responsive signal. Moreover, if a number of articles that include passive RFID tags are located in close proximity, an excitation signal transmitted by an RFID transmitter may excite multiple of the passive RFID tags, causing each tag to transmit its unique identifier. While protocols exist that may prevent the RFID tags from transmitting their identifier simultaneously, it may not, in some case, be possible to determine which article transmitted a unique identifier in situations where multiple passive RFID tags transmit in response to an excitation signal.

In contrast, an active RFID tag refers to an RFID tag that includes its own power source. Typically, the power source consists of a small battery, although solar cells or other power sources may be used. Active RFID tags may be designed to transmit the information stored in the memory thereof in response to receiving an excitation signal and/or may transmit this information on their own accord when certain conditions are met.

Pursuant to embodiments of the present invention, patch cords are provided that include an active RFID tag in each plug connector thereof. It will be appreciated that in some embodiments the active RFID tags may be mounted in or on each plug housing, while in other embodiments the active RFID tags may be mounted close to the plugs, such as in or on a strain relief boot or in or on a portion of the cable that is adjacent the plugs.

Each plug may include a plug latch. As is known to those of skill in the art, a plug latch refers to a tab or other activation mechanism that may be depressed or otherwise activated to unlock a plug from a mating connector. For example, RJ-45 plugs and various types of fiber optic plugs (e.g., LC plugs) typically include plug latches in the form of a cantilevered member. A technician may depress the free end of the cantilevered plug latch to unlock the plug so that it may be removed from a mating RJ-45 jack or fiber optic adapter/connector. Other plugs such as MPO fiber optic connectors often use a so-called "push-on" latch mechanism. In both cases, as well as with any other type of latch mechanism, each plug may be designed so that activation of the plug latch causes the active RFID tag to transmit the unique identifier that is stored in the memory thereof. As a result, the active RFID tag on a particular patch cord plug will transmit its unique identifier each time the plug is inserted into, or removed from, a connector port.

Figure 9:
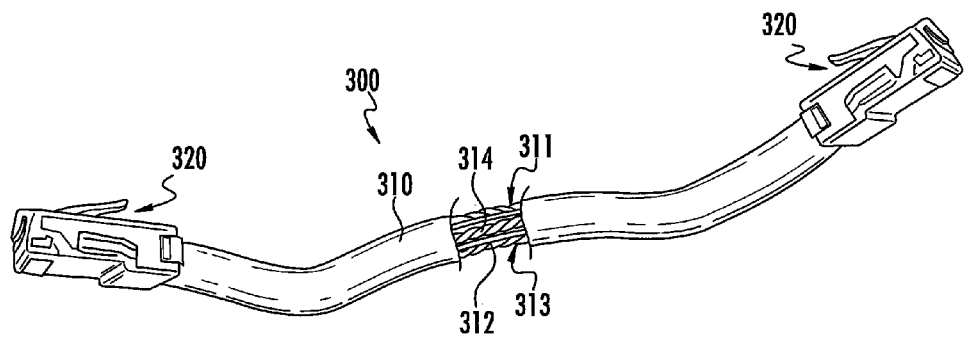
FIG. 9 is a perspective view of a patch cord that includes active RFID tags according to embodiments of the present invention.
Figure 10:
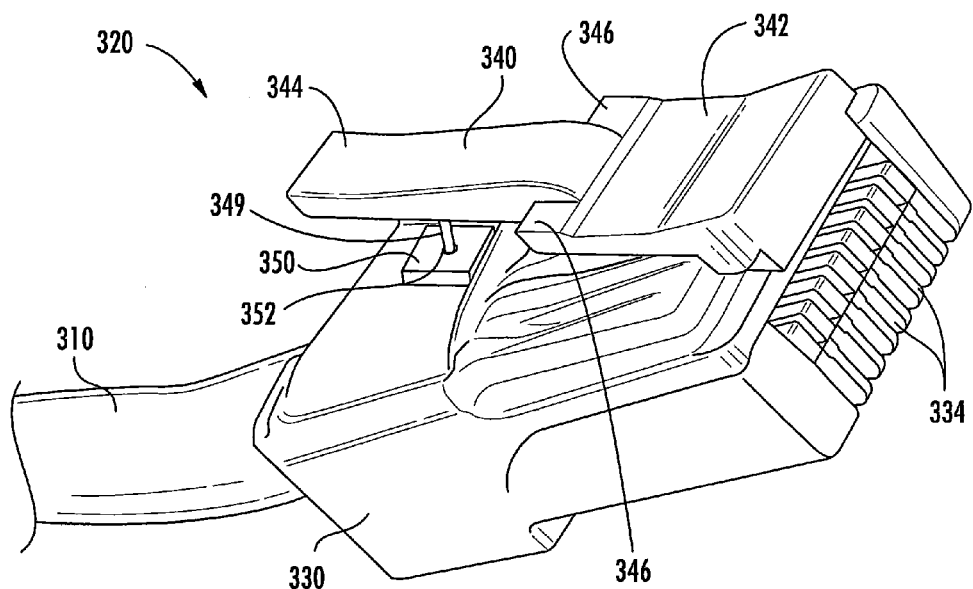
FIG. 10 is an enlarged perspective view of one of the plugs of the patch cord of FIG. 9.
Figure 11:
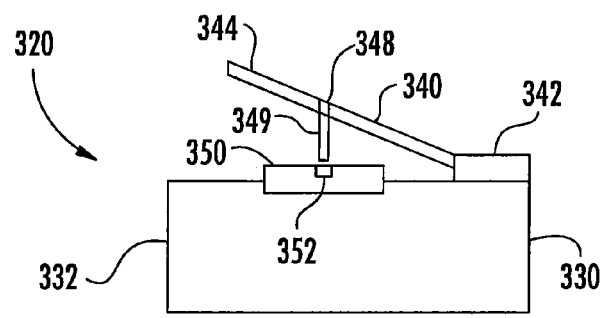
FIG. 11 is a schematic side view of the plug latch and active RFID tag that are included on the plug of FIG. 10.
Figure 12:
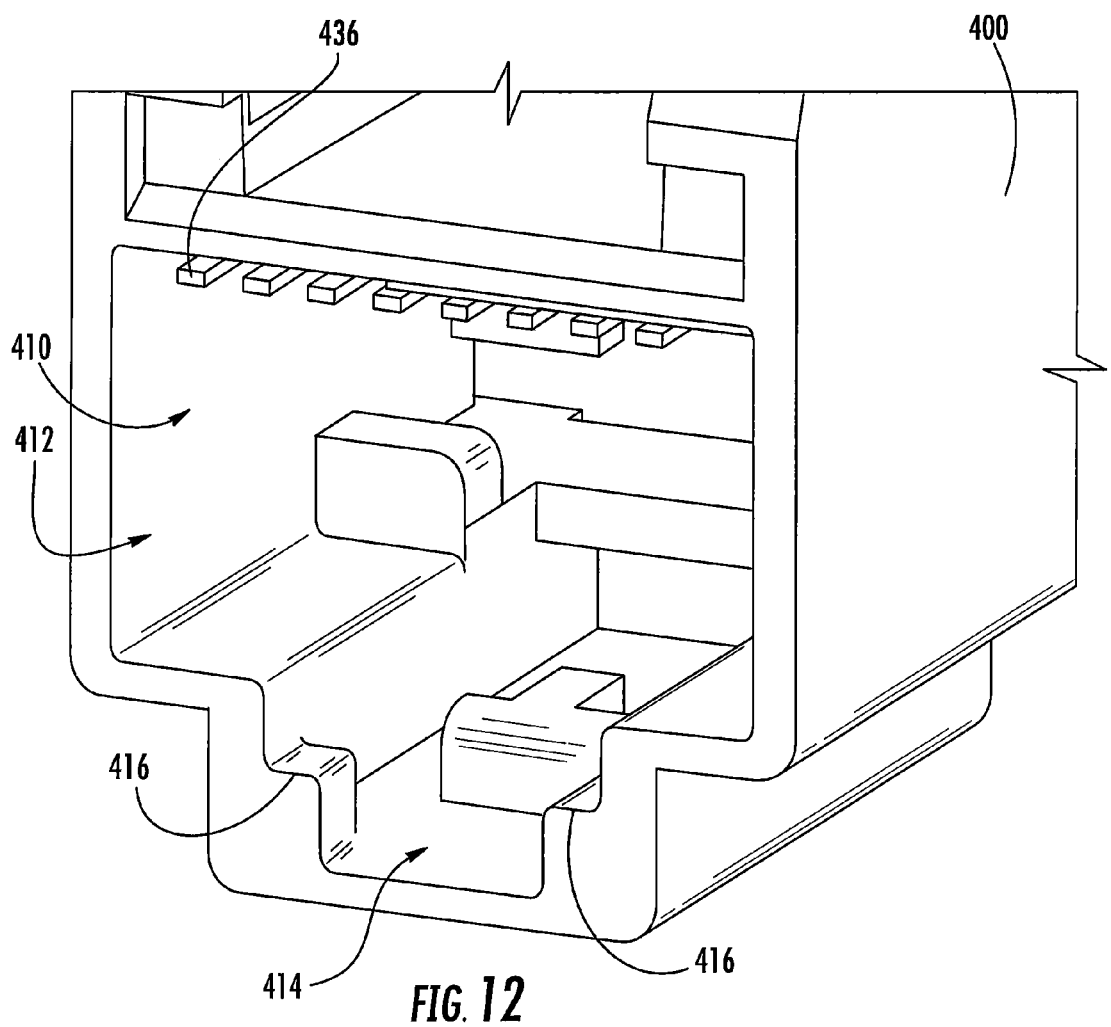
FIG. 12 is a schematic perspective view of the front portion of a conventional RJ-45 jack.

FIGS. 9-11 illustrate an embodiment of an intelligent patch cord 300 according to certain embodiments of the present invention that includes a plug latch activated active RFID tag. The particular patch cord 300 illustrated in the example of FIGS. 9-11 is an Ethernet patch cord having RJ-45 plugs on either end thereof. FIG. 9 is a perspective view of the patch cord 300. FIG. 10 is an enlarged perspective view of one of the plugs of the patch cord 300. FIG. 11 is a schematic side view of the plug latch and active RFID tag that are included on the plug of FIG. 10. The RJ-45 plugs on the patch cord 300 are configured to be received in a mating jack. FIG. 12 is a schematic perspective view of the front portion of a conventional RJ-45 jack 400 that illustrates features of the housing of the jack 400 that cooperate with the plugs of the patch cord to implement the active RFID tag functionality thereof.

As shown in FIGS. 9-11, the patch cord 300 includes a cable 310 and a pair of plugs 320. As shown in FIG. 9, the cable 310 may comprise, for example, an Ethernet cable having four twisted pairs of insulated conductors 311-314 such as a Category 6 or Category 6a communications cable, any type of fiber optic cable, a coaxial cable, or a hybrid cable. The plugs 320 are mounted on the respective ends of the cable 310. In the depicted embodiment, each plug 320 comprises an RJ-45 plug and the cable 310 comprises a Category 6a Ethernet cable.

Referring to FIG. 10, each plug includes a housing 330, a plug latch 340 and an active RFID tag 350. Each housing 330 may have an aperture 332 in a back end thereof that receives a respective end of the communications cable 310. A plurality of slots 334 are included along the forward portion of the top surface of the housing 330. Each of the slots 334 may also extend along the front surface of the housing 330. A plurality of plug blades (not visible in the drawings) may be mounted within the interior of the housing 330. Each plug blade may be electrically connected to a respective one of the conductors in the cable 310. Each plug blade may also be mounted to extend into a respective one of the slots 334. The slots 334 provide access to the respective plug blades 336 so that the contacts of a mating RJ-45 jack may physically contact and electrically connect to the respective plug blades. FIG. 12 is a perspective view of a conventional RJ-45 jack that illustrates the plug contacts 436 thereof that mate with the respective plug blades.

The plug latch 340 extends from the bottom surface of the housing 330 (the plug 320 is depicted in an upside-down orientation in FIG. 10). The base 342 of the plug latch 340 may be positioned along the forward edge of the bottom surface of the housing 330, and the arm 344 of the plug latch 340 may extend downwardly and rearwardly from the base 342. The plug latch 340 may extend from the housing 330 in a cantilevered fashion, with the base 342 of the plug latch 340 connected to the housing 330 and the distal portion of the arm 344 being free. The base 342 may be wider than the arm 344, thereby defining a pair of tabs 346 that are located on either side of the portion of the arm 344 that mates with the base 342. The above-described plug housing 330 and plug latch design is conventional and widely used in RJ-45 plugs.

As noted above, the plug latch 340 is mounted in cantilevered fashion from the housing 330 and is formed of a resilient material such as a resilient plastic material. Accordingly, the free end of the plug latch 340 is movable over some range of movement. In FIG. 10, the plug latch 340 is illustrated in its normal "resting" position (i.e., the position that the plug latch 340 will take when no force is applied thereto). A technician may depress the arm 344 of the plug latch 340 downwardly towards the plug housing 330. Such depression of the arm 344 likewise depresses the tabs 346 of the base downwardly toward the plug housing 330.

As is known to those of skill in the art, the housing of an RJ-45 jack includes a plug aperture that is configured to snugly receive a mating RJ-45 plug. As shown in FIG. 12, the plug aperture 410 of RJ-45 jack 400 may define a generally rectangular opening 412 that has a channel 414 formed in a bottom surface thereof. The rectangular opening 412 may be sized to receive the housing 330 of the RJ-45 plug 320, and the channel 414 may be sized to receive the plug latch 340. As the plug 320 is inserted into the plug aperture 410 of jack 400, the front edge of the channel 414 engages the plug latch 340 and thereby depresses the arm 344 of plug latch 340 upwardly toward the plug housing 330.

A pair of small, spaced apart, upwardly projecting stops 416 are provided at the forward edge of the channel 414. The stops 416 are spaced-apart sufficiently so that the arm 344 of the plug latch 340 on plug 320 may pass between the stops 416. As the plug 320 is inserted within the plug aperture 410, the stops 416 press upwardly on the tabs 346 that are provided on the base 342 of plug latch 340. This upward force depresses the plug latch 340 upwardly towards the plug housing 330, and allows the tabs 346 to pass over the stops 416 so that the plug 320 may be inserted within the plug aperture 410. Once the tabs 346 are within the plug aperture 410 and pass beyond the stops 416, the upward force is removed, and the plug latch 340 may resiliently snap back into its resting position. In this resting position, the distal end of the plug latch and the tabs 346 are farther from the plug housing 330. The stops 416 of jack 400 are designed so that when the plug latch 340 of plug 320 is received within the plug aperture 410 is in its resting position, the tabs 346 are trapped behind the stops 416 in the jack housing, thereby locking the plug 320 within the plug aperture 410. To remove the plug 320 from the jack 400, a technician may press upwardly on the distal end of the plug latch 340 so that the tabs 346 are pressed upwardly so that they may pass over the stops 416 when the technician applies a pulling force on the plug 320.

As is shown in FIGS. 10 and 11, the arm 344 of plug latch 340 includes a laterally disposed tab 348 that has an upwardly facing projection 349. The active RFID tag 350 is mounted on or within the bottom surface of the plug housing 330 directly above the projection 349. When the plug latch 340 is depressed upwardly by a technician, the tab 349 is forced upwardly so that it contacts and depresses a mechanical switch 352 that is provided in the active RFID tag 350. When the switch 352 is depressed, a circuit within the RFID tag 350 is closed that causes the RFID tag 350 to transmit the information stored in the memory thereof. As explained above, each time the plug 320 is inserted into, or removed from, a mating jack 400 (i.e., a connector port on any of the equipment 150 discussed above), the plug latch 340 will be depressed. Accordingly, the active RFID tag 350 will transmit each time the plug 320 is inserted into, or removed from, a mating connector port, but otherwise generally will not transmit information.

The patch cords 300 according to embodiments of the present invention may be used in conjunction with the intelligent network monitoring system 100 to automatically track patch cord connections. For example, as discussed above, the intelligent network monitoring system 100 may include an RFID antenna 126 and an RFID receiver 128. The RFID antenna 126 and RFID receiver 128 may receive the RFID signals that are transmitted by the active RFID tags 350 on the patch cords 300 when the plugs 320 thereof are plugged into connector ports 156 that are within a certain range. Upon receiving such an RFID signal, the RFID receiver 128 of the intelligent network monitoring system 100 reads the unique identifier from the received RFID signal and records the time when the RFID signal was received. The intelligent network monitoring system 100 may also record the times when patching changes are detected at the connector ports 156 on the rack mounted equipment 150 that the intelligent network monitoring system 100 monitors. The intelligent network monitoring system 100 may then correlate the time when the RFID signal is received with the closest time at which a connector port 156 was identified by the three-dimensional scanner 120 as receiving a patch cord 300 to identify the connector port 156 that the patch cord 300 was plugged into. In a similar fashion, when the patch cord 300 is removed from a connector port 156, the active RFID tag 350 will transmit an RFID signal that includes the unique identifier for the patch cord 300. The RFID antenna 126 and RFID receiver 128 of the intelligent network monitoring system 100 may receive this RFID signal and may read the unique identifier therefrom and record the time when the RFID signal was received. The intelligent network monitoring system 100 may then correlate the time when the RFID signal is received with the closest time at which a connector port 156 was identified by the intelligent network monitoring system 100 as having a patch cord 300 removed therefrom to identify the connector port 156 that the patch cord 300 was removed from. In this manner, the intelligent infrastructure management system may automatically track the patching connections. Notably, while this methodology requires the use of specialized patch cords that have active RFID tags, the methodology will work with any type of equipment including passive (non-intelligent) patch panels, network switches, servers and the like.

Essentially all patch cord plugs that are used in office networks and data center operations include a plug latch, including fiber optic patch cords. Accordingly, the intelligent patching techniques described above may be used on fiber optic patch cords as well as on Ethernet patch cords. This in contrast to many other intelligent patching solutions which are only designed to work on Ethernet patch cords and patch panels. For example, the active RFID tags 350 may be placed on MPO fiber optic trunk cables and patch cords and MPO and LC fiber optic fan out cables.

In some embodiments, the active RFID tags 350 may include information in addition to a unique identifier. For example, in some embodiments, the memory in the active RFID tag may also include information about the type of patch cord/cable and/or information regarding the performance of the patch cord/cable that the RFID tag is mounted on.

In some cases, the patching connections may be made in a communications system before the system is fully deployed. When this occurs, it may be necessary to populate the connectivity database with the existing patch cord connections before the system may go operational. A configuration probe may be used in these circumstances to load the connectivity database. The configuration probe may comprise a handheld RFID reader that may wirelessly communicate with the intelligent network monitoring systems 100 via, for example, Bluetooth communications. A technician may touch the configuration probe to each patch cord plug that is plugged into a connector port 156 on a piece of equipment 150 that is monitored by a specific one of the intelligent network monitoring systems 100. The configuration probe reads the unique identifier from the memory in the active RFID tag 350 on the patch cord 300, and wirelessly transmits the identifier to the intelligent network monitoring systems 100. The intelligent network monitoring systems 100 uses images captured by the scanner 120 to determine the specific connector port 156 on the specific item of equipment 150 that the patch cord is inserted into that the technician touched with the configuration probe, and thus determines that the unique identifier received from the configuration probe is the identifier for the patch cord that is plugged into the connector port. The intelligent network monitoring systems 100 may then update the connectivity database with this information. As both plugs on a given patch cord 300 have active RFID tags 350 that have the same unique identifier stored therein, the system can readily determine all of the patch cord connections once all of the connector ports 156 have been probed in the manner described above using the configuration probe.

It will be appreciated that many modifications may be made to the patch cord of FIGS. 9-11. For example, in other embodiments, the active RFID tag 350 may be triggered to transmit the information stored in the RFID tag by an activation mechanism other than depression of the plug latch. For example, in another embodiment, a sensor in the plug may sense if the plug is received within a connector port, and the active RFID tag may be triggered to transmit the unique identifier each time it senses that the plug transitions from being outside to inside a connector port or vice versa.

As described above, in some embodiments of the present invention, a camera or scanner is used to capture one or more images that are then correlated with information in a database such as other previously captured images to make certain determinations, such as whether or not a particular connector port has a plug of a patch cord inserted therein. Herein, such a scanner or camera may be referred to generically as an "image capture device." Herein a determination that is made as to whether or not a connector port has a patch cord plugged into it may be referred to as a determination as to the patch cord insertion status of the connector port. Herein reference is made to "equipment racks." It will be appreciated that the term "rack" is used broadly to cover open racks, closed or closeable equipment cabinets and other such structures that a plurality of patch panels and/or a plurality of network equipment may be mounted on in operation. It will also be appreciated that the term "connector port" is used broadly to refer to a wide variety of connectors including Ethernet connectors such as RJ-45 and RJ-11 jacks and a wide variety of fiber optic connectors such as fiber optic adapters, plugs, jacks and the like.

The present invention has been described above with reference to the accompanying drawings, in which certain embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of identifying available connector ports on rack mounted equipment, the method comprising:
   using an image capture device to capture an image of a front face of an equipment rack;
   comparing the captured image to at least one stored image; and
   detecting a change in patch cord insertion status of at least one connector port included on an item of equipment that is mounted on the equipment rack based at least in part on the comparison of the captured image to the at least one stored image, wherein the image capture device comprises a controller that is mounted above the equipment rack that includes the item of equipment that has the at least one connector port, wherein the controller is configured to detect patch cord insertions into the at least one connector ports on the item of equipment by capturing three dimensional images of the item of equipment and comparing the captured images to stored images to determine the availability status of the at least one connector port included on the item of equipment mounted in the equipment rack.

2. The method of claim 1, wherein the image capture device comprises an overhead mounted CMOS scanner.

3. The method of claim 1, further comprising tracking the available connector ports on each item of equipment that is mounted on the equipment rack based at least in part on the comparison of the captured image to the at least one stored image.

4. The method of claim 1, further comprising issuing an electronic work order that includes an instruction that a first patch cord be inserted into a first connector port on a first piece of equipment, wherein the first connector port is selected for inclusion in the electronic work order based at least in part on the determination that the patch cord insertion status of the first connector port is that the first connector port is available.

5. The method of claim 1, further comprising using the determined patch cord insertion status of the at least one connector port to confirm that a step in an electronic work order was completed.

6. The method of claim 1, further comprising determining a power cord insertion status of at least one power outlet based at least in part on the comparison of the captured image to the at least one stored image.

7. The method of claim 1, wherein the image capture device periodically captures the three dimensional images.

8. A method of automatically tracking patch cord connections, the method comprising:
   inserting a patch cord into a connector port;
   detecting the insertion of the patch cord into the connector port using an image capture device, wherein the image capture device comprises a controller that is mounted above the equipment rack that includes a piece of equipment that has the connector port, wherein the controller is configured to detect patch cord insertions into connector ports on the equipment by capturing three dimensional images of the equipment and comparing the captured images to stored images to determine the availability status of the connector ports included on the equipment mounted in the rack;
   receiving an RFID signal that includes an identifier for the patch cord, wherein the RFID signal is automatically transmitted by an active RFID tag that is included on the patch cord in response to the patch cord being inserted into the connector port; and
   determining that the patch cord was inserted into the connector port based at least in part on a time that the RFID signal was received.

9. The method of claim 8, wherein the active RFID tag is configured to automatically transmit an RFID signal in response to depression of a plug latch on a first plug of the patch cord.

10. The method of claim 8, wherein the connector port is a connector port of a device that does not include any hardware for tracking patch cord connections.

11. The method of claim 8, wherein the image capture device periodically captures the three dimensional images.

12. The method of claim 8, wherein the active RFID tag is configured to only actively transmit in response to the active RFID tag being inserted into, or removed from, a connector port.

13. A method of tracking rack-mounted equipment in a communication system, the method comprising:
   using an image capture device to capture an image of a front face of an equipment rack;
   comparing the captured image to at least one stored image; and
   detecting changes in the available slots in the equipment rack based at least in part on the comparison of the captured image to the at least one stored image, wherein the image capture device comprises a controller that is mounted above the equipment rack that includes a piece of equipment that has the available slots, wherein the controller is configured to detect patch cord insertions into the available slots on the equipment by capturing three dimensional images of the equipment rack and comparing the captured images to stored images to determine availability status of the available slots included on the equipment mounted in the rack.

14. The method of claim 13, further comprising identifying the equipment by equipment type that is mounted in occupied slots of the equipment rack based at least in part on the comparison of the captured image to the at least one stored image.

* * * * *